Sept. 13, 1949.  E. J. OPITZ  2,482,023
PRESS WELDING MACHINE
Filed Aug. 20, 1948  3 Sheets-Sheet 1

INVENTOR.
Eric J. Opitz
BY
Barnes, Kisselle, Laughlin & Raisch
ATTORNEYS.

Sept. 13, 1949.　　　　　　　E. J. OPITZ　　　　　　　2,482,023
PRESS WELDING MACHINE
Filed Aug. 20, 1948　　　　　　　　　　　　　　　3 Sheets-Sheet 2
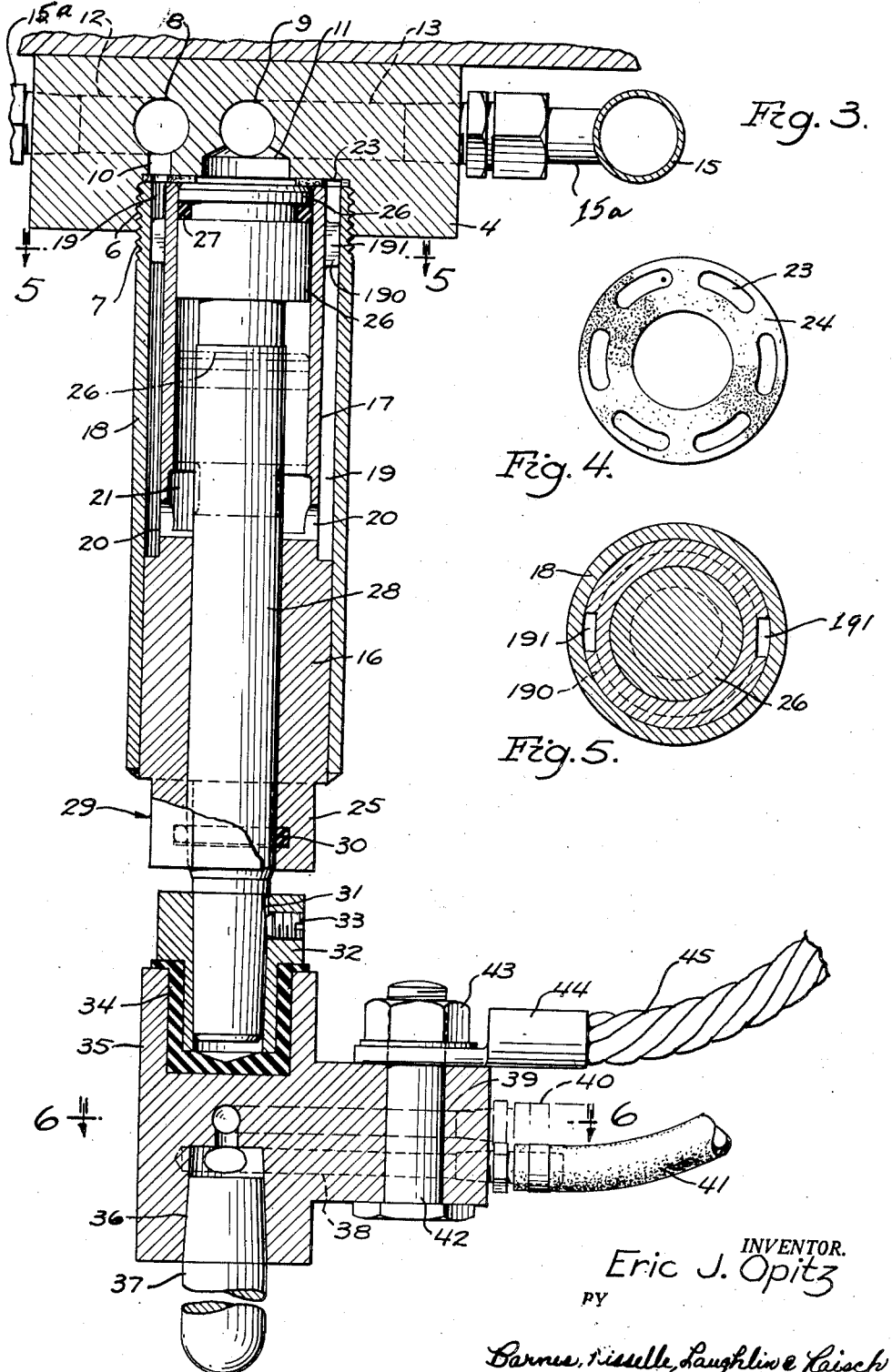
INVENTOR.
Eric J. Opitz
BY
Barnes, Kisselle, Laughlin & Raisch
ATTORNEYS.

Sept. 13, 1949.  E. J. OPITZ  2,482,023
PRESS WELDING MACHINE
Filed Aug. 20, 1948  3 Sheets-Sheet 3

INVENTOR.
Eric J. Opitz
BY
Barnes, Kisselle, Laughlin & Raisch
ATTORNEYS.

Patented Sept. 13, 1949

2,482,023

UNITED STATES PATENT OFFICE 2,482,023

PRESS WELDING MACHINE

Eric J. Opitz, Pleasant Ridge, Mich., assignor to General Motors Corporation, Detroit, Mich., a corporation of Delaware Application August 20, 1948, Serial No. 45,417

8 Claims. (Cl. 219—4)

This invention relates to pressure welding machines, particularly pressure welding of the type shown, described, and claimed in the Beiderman Patent 2,295,925. These pressure welders operate on the principle of bringing the work and a large number of welding electrodes in simultaneous contact. Groups of electrodes are served, each by a separate transformer, and the transformers are either individually or in groups successively energized. Only one direct spot weld or two spot welds in series are ordinarily made from a single secondary, but each transformer has two or more secondaries.

In a large welding machine for welding the overlapped flanges of door panels or the large floor pans of automobiles, a large number of electrodes is supported in the machine. In fact in some of the floor pan welders as many as 100 electrodes are supported in the machine. These electrodes are each connected with the piston of a hydraulic cylinder so as to provide a fluid pressure backing for the electrodes when they contact the work and thereby insure an equalization of the pressure of the electrodes on the work notwithstanding irregularities in the work such as elevations or depressions. It is highly desirable to have uniform pressure on the electrodes so as not to vary the resistance of the current passing through the work and thereby impair some of the welds. These are all features and attributes of the pressure welding machine described and claimed in the aforementioned Beiderman patent.

These hydraulic cylinders had been, in the practice of the Beiderman invention, secured to a platen or other support by bolting. One way of securing them has been to bore holes in the platen, provide a large threaded stud on the upper end of the hydraulic cylinder, pass the threaded stud through the bored opening in the platen and clamp the cylinder to the platen by the application of a large nut to the threaded end of the stud. However each cylinder has required two separate hose connections for delivering the hydraulic pressure to the opposite ends of the cylinder. When the machine has as many as 100 or more electrodes, these many pieces of hose carrying oil under heavy pressure involves a considerable complication in the design of the machine, the location of the elements, and the placing of welds, in view of the interference posed by such a large number of flexible hoses underneath the platen. This is particularly true when it is realized that each electrode holder must have two hose connections for providing cooling water for the electrodes and each electrode must have a heavy secondary cable connection. In other words, in the pressure system of welding, such as shown and described in the Beiderman patent, each electrode and hydraulic cylinder supporting the electrode has required four flexible hose connections and one heavy secondary cable connection.

Furthermore, these nuts which support the hydraulic cylinders are only accessible from the top of the platens, and in view of the complication introduced into the machine of the large number of small transformers used, and the large number of hose and cable connections, it has been often difficult to reach the nuts on the top of the platens and turn the nuts with a wrench to release them and the hydraulic cylinder when this becomes necessary for maintenance reasons or for replacement or relocation.

Furthermore, these many hose connections for the oil resulted in a very considerable maintenance service involving expense and delay.

It is an object of the present invention to provide a new arrangement for supporting the electrode cylinders of a pressure welder whereby these cylinders are supported in groups on separate plates or blocks on the platen. These blocks or plates are provided with cored or bored passageways through which the fluid pressure passes to the cylinders and returns from the cylinders, and each of the cylinders is screwed into a threaded socket in the plate or block and has a suitable arrangement of passageways in the cylinder walls and the block to connect the cylinder with the two fluid passageways in the block when the cylinder is screwed home.

Referring to the drawings:

Figure 3 is a section on the line 3—3 of Figure 1.

Figure 4 is a detail of the packing ring.

Figure 5 is a section on the line 5—5 of Figure 3.

Figure 1:
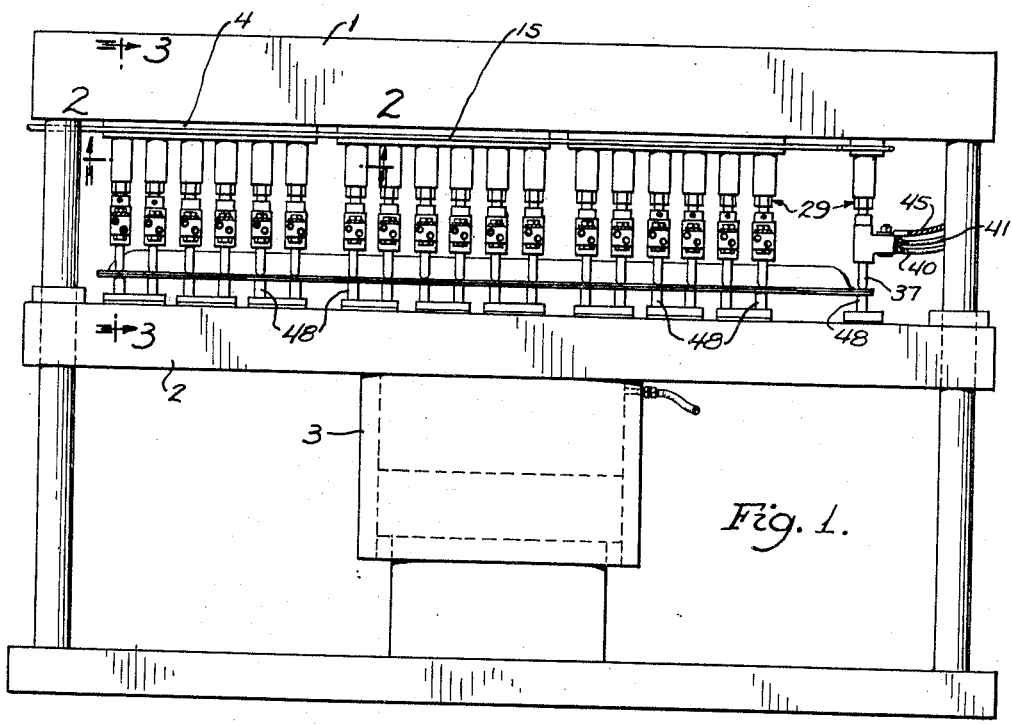
Figure 1 is a front elevation of part of a pressure welder involving the invention.

The platen is designated 1. 2 is the table or bed of the machine which is raised and lowered by fluid pressure in cylinder 3. Of course the arrangement might be reversed so that the table is stationary and the platen is raised and lowered with the electrodes. Secured to the platen 1 are a plurality of blocks or plates 4. These are removably secured in place by screws 5. Each block is provided with a plurality of threaded sockets 6, arranged to receive the threaded upper end of fluid cylinder 7. Each of the blocks has a pair of fluid passageways 8 and 9. These passageways may be bored or cored in the block. Passageway 8 connects with the threaded socket near its threaded wall by means of passageway 10. The passageway 9 connects with the countersunk recess 11 in the threaded socket by intersecting such counter-sunk recess as shown in the drawing. These passageways are connected by cross passages, one the passageway 12 and the other the passageway 13, with pressure main 14 and 15 respectively. These mains are located at the sides of the blocks and connected with these cross passageways 12 and 13 by T's 15a.

Figure 2:
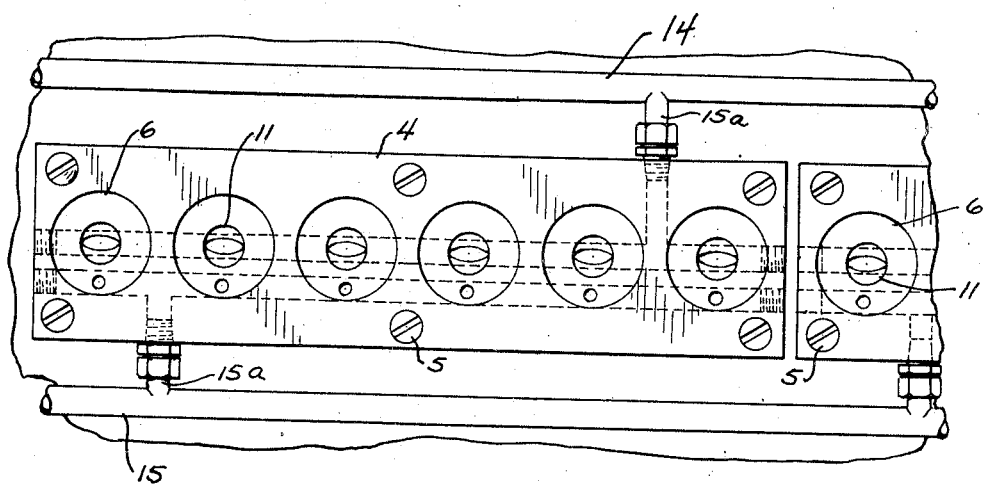
Figure 2 is a section on the line 2—2 of Figure 1, showing the plate or block with the cylinders removed from the sockets.
Figure 6:
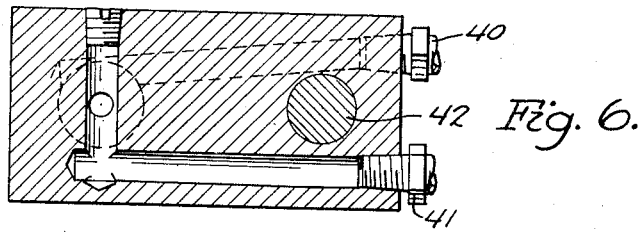
Figure 6 is a section on the line 6—6 of Figure 3.

The piston is guided in part 16 which has an annular recess 17 turned in its mid-portion and a recess 19 at the upper end separated by a spacing ring 190. The sleeve 18 fits over part 16 and is welded to it at the lower end. The annular chamber 17 is connected with chamber 19 by the milled slots 191. Passage 10 will always register with one of the slots 23 in the packing ring 24, and the chamber 19, thereby being in direct communication with the passage 10 leading to and from the passageway 8 in the block. This assures a proper connection at all times of the chamber 21 below the piston with passageway 8 when the cylinder is screwed home by applying a wrench to the hexagonal end 29 of the cylinder. With this arrangement these threaded sockets for the cylinders may be arranged closely together as shown in Figure 2 and the cylinder may be easily removed or replaced by merely applying a wrench to the lower hexagonal end 29 of the cylinder and screwing the cylinder in or out.

It is desirable to use separate blocks for holding groups of electrodes so that when a change is made in the work necessitating the shifting of the weld spots, it is not necessary to revise the whole platen. The change may be a relatively small one, so all that is necessary to do is to remove one block and replace it with a new block. Or the old block may be removed and the old holes that formed the sockets plugged with metal and new holes drilled.

This arrangement makes it very easy to make changes in the position of the welds without too much trouble and maintenance expense. Furthermore, it completely eliminates the flexible hoses or metal tubes, two for each cylinder. When it is known that the hydraulic pressure maintained in these pressure welders has a range from 200 to 400 pounds per square inch, it will be obvious that it is a very great improvement to eliminate the connectors with their complications and maintenance problems and substitute the thoroughly reliable pipe connection to each cylinder. This insures much less trouble and expense in maintenance and eliminates danger due to the blowing of the connector under the heavy pressure maintained.

The other parts of the machine can now be described. 26 represents the piston which reciprocates in the cylinder and has an O ring packing 27. 28 is the piston rod which is also packed in part 25 by means of the O ring packing 30.

Figure 7:
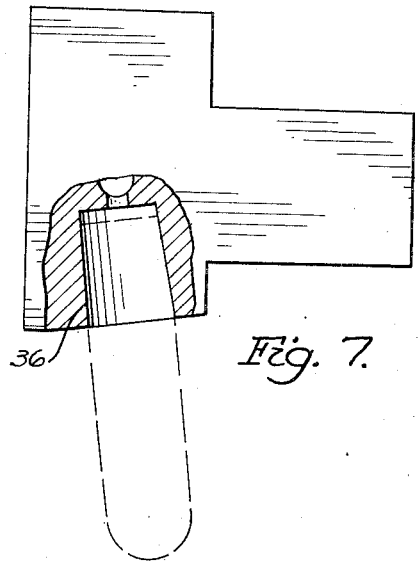
Figure 7 is a detail view of the electrode holder showing the electrode socket in section.
Figure 8:
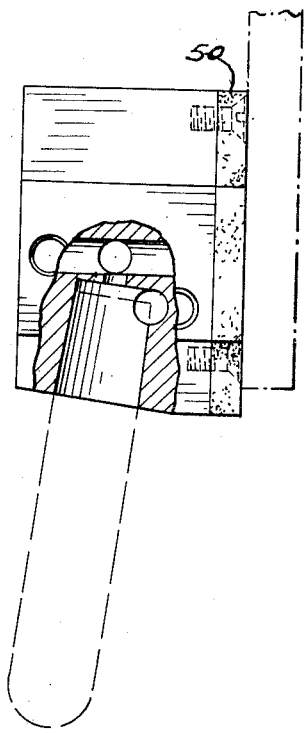
Figure 8 is a view of the electrode holder from a 90° angle with respect to the view of Figure 7.

The end of the piston rod is reduced in diameter and provided with a flat 31 which is secured to bushing 32 by a set screw 33. This bushing has a reduced lower portion which is press fitted or screwed into an insulating sleeve 34 which in turn is press fitted into the electrode-holding block 35. This block or electrode holder is provided with a tapered recess 36 into which is driven the electrode 37. The block has water passages 38 and 39 connected with hoses 40 and 41. Insulation 50 is attached to one side of the block. Secured to the top of the block by bolt 42 and nut 43 is the terminal 44 of the heavy secondary cable 45. It will be noticed that the electrodes may be angularly set in the block (see Figures 7 and 8).

Figure 9:
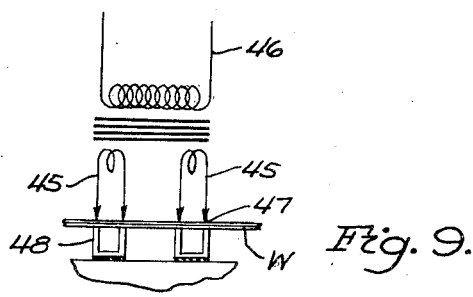
Figure 9 is a diagrammatic view showing the circuits of one transformer.

The secondaries are in the transformer, independent of one another as shown in Figure 9. There are two secondaries here shown in connection with one primary 46. Each secondary makes a pair of series welds 47 by reason of the electrode pads 48 on the under side of the work W. This is explained in detail in the prior Beiderman patent. Of course the series weld need not be used and only one weld may be made by each secondary, but this would require a secondary cable on the under side of the work and two secondary cables for each weld, which introduces complications and undesirable difficulties.

The claims are as follows:

1. In a welding machine a support provided with two independent fluid passageways and provided with threaded recesses made in said support having communication with the passageways and motor cylinders, having each a threaded open end screwed into the recess the said open end making communication with one passageway and each cylinder having a recess in the cylinder wall making communication with the other fluid passageway and the other end of the cylinder.

2. In a welding machine a support provided with two independent fluid passageways and provided with threaded recesses made in said support having communication with the passageways and motor cylinders, having each a threaded open end screwed into the recess the said open end making communication with one passageway and each cylinder having a recess in the cylinder wall making communication with the other fluid passageway and the other end of the cylinder, and a ring of packing material pinched between the end of each cylinder and the bottom of each recess.

3. In a welding machine a support provided with two independent fluid passageways and provided with threaded recesses made in said support having communication with the passageways and motor cylinders, having each a threaded open end screwed into the recess the said open end making communication with one passageway and each cylinder having a recess in the cylinder wall making communication with the other fluid passageway and the other end of the cylinder, and a slotted ring of packing material pinched between the end of each cylinder and the bottom of each recess.

4. In a welding machine, the combination of a support provided with a pair of fluid passageways through the support and a plurality of interiorly threaded recesses each having communication with each passageway, and a motor cylinder having a threaded end screwing into said recess and making communication between one end of the cylinder and one passageway and the other end of the cylinder and the other passageway in the support.

5. In a welding machine, the combination of a support provided with a pair of fluid passageways through the support and a plurality of interiorly threaded recesses each having communication with each passageway, and a motor cylinder having a threaded end screwing into said recess and making communication between one end of the cylinder and one passageway and the other end of the cylinder and the other passageway in the support, the said cylinder having one or more longitudinal slots connecting annular recesses in said cylinder, one of said annular recesses arranged to overlap a passage leading into one of said passageways and the other annular recess having a port into the lower end of the motor cylinder.

6. In a welding machine, the combination of a support provided with a pair of fluid passageways through the support and a plurality of interiorly threaded recesses each having communication with each passageway, and a motor cylinder having a threaded end screwing into said recess and making communication between one end of the cylinder and one passageway and the other end of the cylinder and the other passageway in the support, the said cylinder having one or more longitudinal slots connecting annular recesses in said cylinder, one of said annular recesses arranged to overlap a passage leading into one of said passageways and the other annular recess having a port into the lower end of the motor cylinder, and a slotted packing ring interposed between the threaded end of each cylinder and the bottom of each threaded recess to seal the cylinder in the support with one of the slots overlapping the outlet passageway on the support and the inner annular recess of the motor cylinder.

7. In a press welder a platen, a plurality of plates or blocks removably secured to one face of the platen, each plate or block provided with fluid passageways and a plurality of threaded circular recesses in communication with the fluid passageways and motor cylinders provided with recessed walls screwing into said recesses by reason of threads on one of their ends and by said recessed walls thereby making communication between one end of the cylinder and one passageway and the other end of the cylinder and the other passageway, and fluid mains connected with the passageways in said blocks.

8. In a press welder a platen, a plurality of plates or blocks removably secured to one face of the platen, each plate or block provided with fluid passageways and a plurality of threaded circular recesses in communication with the fluid passageways and motor cylinders provided with recessed walls screwing into said recesses by reason of threads on one of their ends and by said recessed walls thereby making communication between one end of the cylinder and one passageway and the other end of the cylinder and the other passageway, and fluid mains connected with the passageways in said blocks, said mains comprising pipe lines on each of two sides of the blocks having T connections with the passageways in the blocks.

ERIC J. OPITZ.

REFERENCES CITED

The following references are of record in the file of this patent:

UNITED STATES PATENTS

| Number | Name | Date |
| --- | --- | --- |
| 2,042,322 | Martin | May 26, 1936 |
| 2,085,105 | Lex | June 29, 1937 |
| 2,193,977 | Martin | Mar. 19, 1940 |